United States Patent Office 3,289,135
Patented Nov. 29, 1966

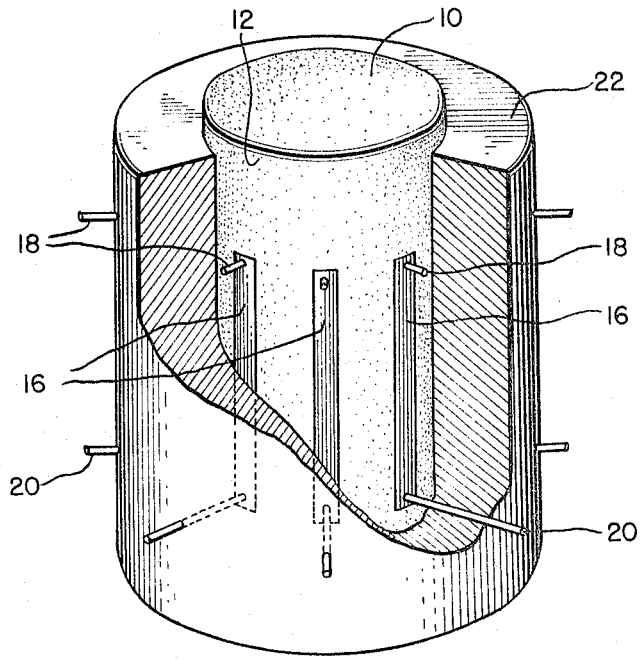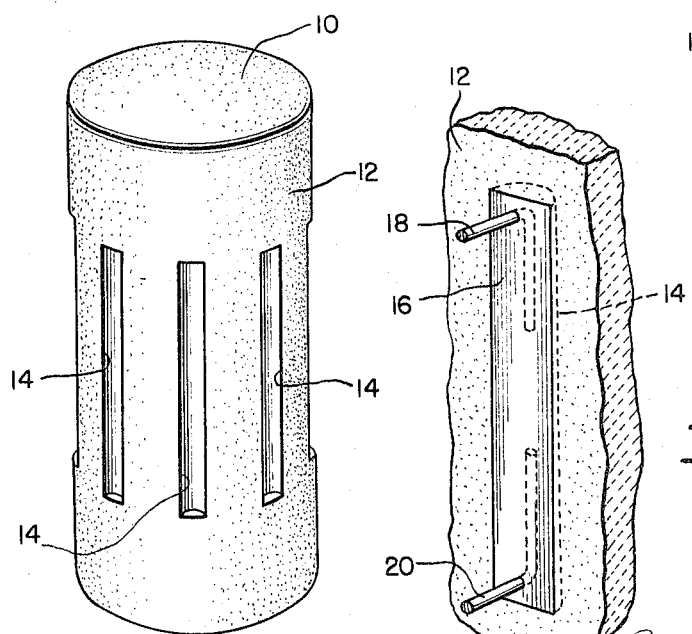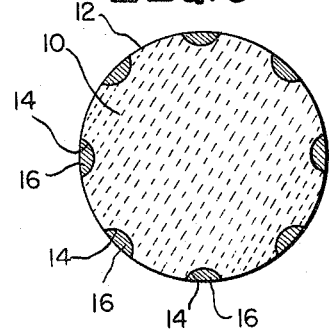

3,289,135
STRAIN GAUGES
Eugene L. Anderson and Leonard U. Rastrelli, both of San Antonio, Tex., assignors, by mesne assignments, to the United States of America as represented by the Secretary of the Navy
Filed Dec. 4, 1963, Ser. No. 328,144
5 Claims. (Cl. 338—5)

The present invention relates to strain gauges and more particularly to a flexible electrical resistance type strain gauge.

Presently available electrical resistance strain gauges are relatively stiff as compared to visco-elastic or elastomeric material, offering reinforcement to the material being tested and resulting in inaccurate readings. Gauges for measuring bi-axial strain because of their larger size are even more inaccurate. The present invention affords a gauge having a flexibility which is compatible to the material being tested.

It is an object of the present invention to provide a new and improved electrical resistance strain gauge.

It is a further object of this invention to provide a flexible strain gauge capable of measuring strains in low modulus materials.

Another object of the invention is to provide a flexible electrical resistance gauge for measuring the deformation of an elastomeric body and comprising a flexible elastomeric-metallic powder emulsion having high conductive qualtities and low resistance relative to the body being tested, the emulsion being retained contiguous to a portion of the body being tested so that deformation thereof causes a geometrical variation in the emulsion whereby the corresponding change in the electrical resistance of the emulsion permits measurement of the deformation.

Still another object is to provide a new and improved method for accurately measuring the deformations of elastomeric materials.

Other objects and advantages will be apparent when taken in connection with the following description and accompanying drawings, wherein:

FIG. 1 is a more or less schematic perspective, partly sectional view showing an embodiment of the present invention;

FIG. 2 is a perspective view of the inner core of FIG. 1 with the outer cylinder removed;

FIG. 3 is a plan, sectional view of FIG. 2; and

FIG. 4 is an enlarged fragmentary view of a portion of FIG. 1.

As stated previously the present invention is directed particularly to taking the strain measurements of relatively weak material. To this end, and referring to FIG. 1, there is shown a core or cylinder 10 which is composed of the material to be tested and which constitutes the specimen body. Formed in the outer wall 12 of the cylinder 10 is a plurality of longitudinally extending grooves or depressions 14. The grooves 14 are relatively shallow compared to the diameter of the cylinder 10.

The present invention contemplates the use of an elastomeric slurry or emulsion having a degree of flexibility compatable with the flexibility or weakness of the test specimen so that the rigidity of the gauge will not introduce error into the results. The flexible emulsion has highly conductive metallic particles interspersed therein so that the emulsion itself has a low resistance relative to the specimen being tested.

Emulsion 16 is "wiped" or applied into the grooves 14 and is electrically connected to an electrical indicating circuit (not shown) by means of lead wires 18 and 20. The electrical indicating circuit to which the gauge is connected forms no part of the instant invention and may comprise a conventional Wheatstone bridge circuit or other suitable electrical indicating means. To retain the emulsion 16 in the grooves 14, preferably, an outer annular cylinder 22 is closely interfitted around the core 10. Cylinder 22 may be composed of the same material as cylinder 10.

It is apparent that deformation of the test body, core 10, will result in a deformation or a change in the geometrical dimensions of length and width of the emulsion 16. The geometrical variation of the emulsion, of course, will result in a change in the electrical resistivity which may be sensed by the electrical indicating system and translated in conventional way into the corresponding deformations of the test specimen. Thus, it is seen that the strain measurements of a very weak material may be accurately taken by use of the gauge of the present invention without introducing the usual error caused by the stiffness of the gauge itself. Obviously, the shape of the test specimen, the number, location and disposition of the grooves and the calibration of the indicating system are each a matter of choice and will be dictated by the particular needs of the tests to be run, and do not necessarily form a part of the present invention.

While we have described an embodiment of the present invention it should be regarded as an example of the invention and not as a restriction or a limitation therein as changes may be made in the construction and arrangement of the parts without departing from the spirit and scope of the invention.

We claim:

1. A flexible electrical resistance gauge for measuring the deformation of an elastomeric body, comprising:
 (a) a cylindrical inner core;
 (b) a plurality of elongated slots formed in said core;
 (c) an elastomeric slurry in said slots;
 (d) an outer cylindrical member encompassing said core and keeping said slurry in said slots; and
 (e) means, including individual pairs of wire connected to each of said slots, for providing an electrical path to said slurry, said slurry having a unit electrical resistance substantially lower than that of said core and said member.

2. The gauge of claim 1 wherein said slots are uniformly spaced about the periphery of said core.

3. The gauge of claim 2 wherein said pairs of wires extend through said member.

4. A flexible electrical resistance gauge for measuring the deformation of an elastomeric body, comprising:
 (a) a first cylindrical member;
 (b) a plurality of slots formed in the periphery of said first member;
 (c) a second cylindrical member in juxtaposition with said periphery;
 (d) an elastomeric slurry in said slots and maintained there between said first and second members; and
 (e) means, including individual pairs of wire connected to each of said slots, for providing an electrical path to said slurry, said slurry having a unit electrical resistance substantially lower than that of said first and second cylindrical members.

5. The gauge of claim 4 wherein said slots are uniformly spaced about said periphery.

References Cited by the Examiner

UNITED STATES PATENTS

| 2,061,863 | 11/1936 | Wells | 73—158 X |
| 2,518,906 | 8/1950 | Kocmich | 201—57 |
| 2,734,978 | 2/1956 | Bulgin | 338—114 |
| 3,137,834 | 6/1964 | Pfann | 338—6 |

FOREIGN PATENTS

| 1,085,077 | 1/1955 | France. |
| 939,282 | 10/1963 | Great Britain. |

RICHARD C. QUEISSER, *Primary Examiner.*

J. J. SMITH, *Assistant Examiner.*